(12) United States Patent
Yu et al.

(10) Patent No.: US 11,182,631 B2
(45) Date of Patent: Nov. 23, 2021

(54) INFORMATION PROCESSING METHOD AND ELECTRONIC DEVICE

(71) Applicant: Lenovo (Beijing) Co., Ltd., Beijing (CN)

(72) Inventors: Zhou Yu, Beijing (CN); Zhihu Wang, Beijing (CN); Xiaodong Chen, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 25 days.

(21) Appl. No.: 16/584,562

(22) Filed: Sep. 26, 2019

(65) Prior Publication Data

US 2020/0104618 A1   Apr. 2, 2020

(30) Foreign Application Priority Data

Sep. 30, 2018 (CN) .......................... 201811163350.4

(51) Int. Cl.
*G06K 9/00* (2006.01)

(52) U.S. Cl.
CPC ................. *G06K 9/00892* (2013.01)

(58) Field of Classification Search
CPC .......... G06K 9/00892; G06K 9/00006; G06K 2009/00932; G06K 9/00; G06K 9/6267; G06K 9/00617; G06K 9/00604; G06K 9/00288; G06K 9/00013; H04L 63/0861; H04L 63/102; H04L 9/3231; H04L 63/0853; H04L 63/0876; H04L 63/20; H04L 2209/805; H04L 63/107; H04L 67/30; H04W 12/08; H04W 12/06; H04W 4/02; H04W 48/04; H04W 4/029; H04W 64/00; H04W 12/12; H04W 12/065; G06F 21/32; G06F 21/53; G06F 2221/2113; G06F 21/31; G06F 21/445; G06F 21/6245; G06F 21/64; G06F 2221/2129; G06F 2221/2149; G07C 9/37; G07C 9/00563; G07C 9/33; G07C 9/00571; G06Q 20/40145; G06Q 20/4016; G06Q 20/308; G06Q 20/40; G06Q 30/0609

See application file for complete search history.

(56) References Cited

U.S. PATENT DOCUMENTS

| | | | | |
|---|---|---|---|---|
| 2004/0133582 A1* | 7/2004 | Howard | ............ | G06K 9/00221 |
| 2012/0159600 A1* | 6/2012 | Takagi | ................... | G06K 9/036 |
| | | | | 726/7 |
| 2013/0311367 A1* | 11/2013 | Chetal | ................ | G06K 9/00973 |
| | | | | 705/43 |
| 2016/0162671 A1* | 6/2016 | Baca | ................... | G06K 9/00892 |
| | | | | 382/115 |
| 2017/0039357 A1* | 2/2017 | Hwang | ................ | G06K 9/6293 |
| 2017/0053108 A1* | 2/2017 | Jakobsson | ............... | H04L 63/10 |
| 2017/0161750 A1* | 6/2017 | Yao | ................... | G06Q 20/40145 |

\* cited by examiner

*Primary Examiner* — Nimesh Patel

(74) *Attorney, Agent, or Firm* — Anova Law Group, PLLC

(57) ABSTRACT

An information processing method and an electronic device are provided. The method includes: acquiring first biometric information and second biometric information of a predetermined object located in a target area by an image acquisition using a synchronous acquisition process; and performing a biometric authentication on the predetermined object by combining the first biometric information and the second biometric information.

16 Claims, 7 Drawing Sheets

INFORMATION PROCESSING METHOD AND ELECTRONIC DEVICE

CROSS-REFERENCES TO RELATED APPLICATION

This application claims the priority of Chinese Patent Application No. 201811163350.4, filed on Sep. 30, 2018, the content of which is incorporated herein by reference in its entirety.

TECHNICAL FIELD

The present disclosure generally relates to the field of electronic technologies and, more particularly, relates to an information processing method and an electronic device.

BACKGROUND

A biometric authentication is a common authentication method for identifying whether a user is a legitimate user. Currently, common biometric authentication methods include fingerprint authentication, iris authentication, and the like. However, there are security problems when the biometric authentication is practically used.

Thus, there is a need to provide an information process method and an electronic device for a secure biometric authentication.

SUMMARY

One aspect of the present disclosure provides an information processing method. The method includes: acquiring first biometric information and second biometric information of a predetermined object located in a target area by an image acquisition using a synchronous acquisition process; and performing a biometric authentication on the predetermined object by combining the first biometric information and the second biometric information.

Another aspect of the present disclosure provides an electronic device. The electronic device includes: a memory configured to store program instructions for performing a method for building images and a processor coupled with the memory. When executing the program instructions, the processor is configured to acquire first biometric information and second biometric information of a predetermined object located in a target area by an image acquisition using a synchronous acquisition process, and perform a biometric authentication on the predetermined object by combining the first biometric information and the second biometric information.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
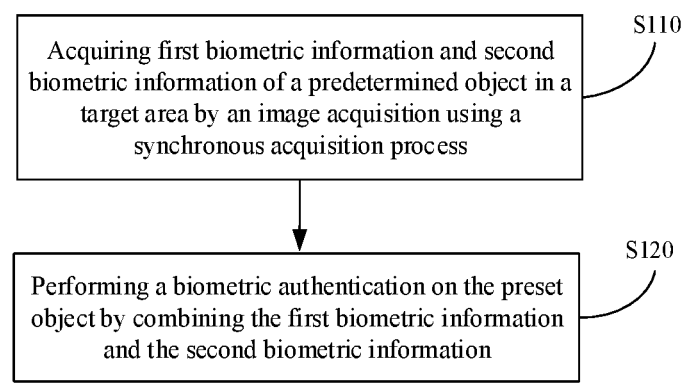
FIG. 1 illustrates an information processing method according to some embodiments of the present disclosure.
Figure 2:
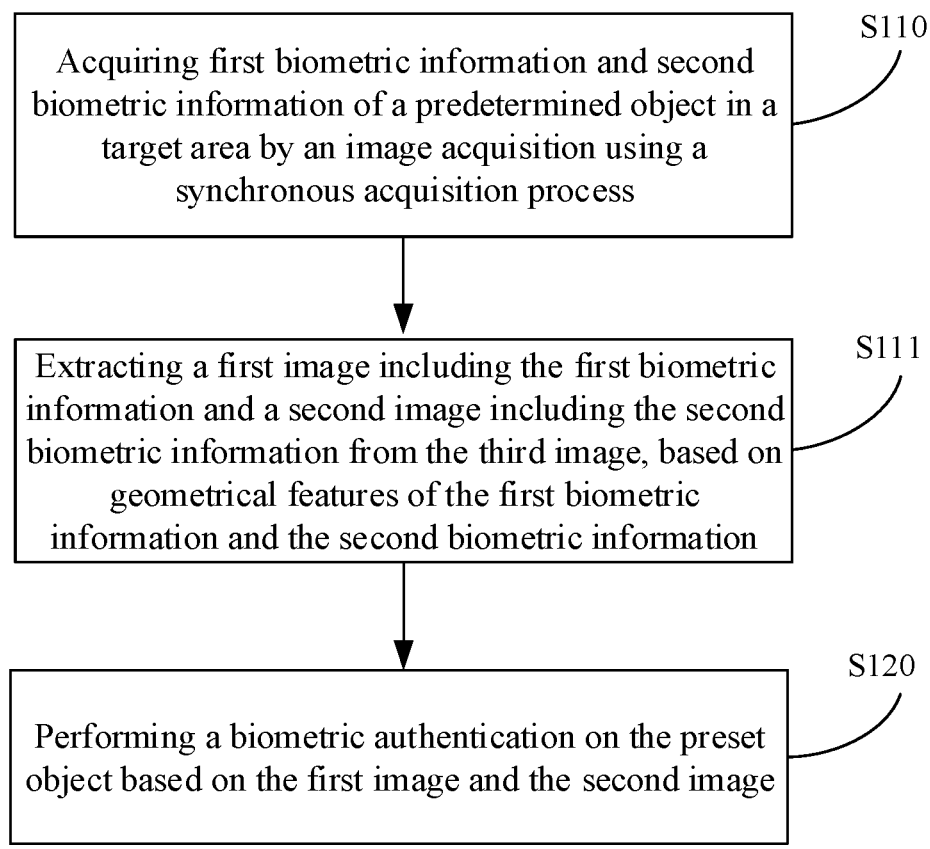
FIG. 2 illustrates another information processing method according to some embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

The present disclosure provides an information process method. As illustrated in FIG. 1, the information process method may include:

S110: based on a synchronous acquisition method, capturing first biometric information and second biometric information of a predetermined object by an image acquisition; and S120: performing a biometric authentication on the predetermined object based on the first biometric information and the second biometric information.

The method provided by the present disclosure may be applied to a same electronic device such as an electronic device with a camera. The electronic device may be a cell phone, a tablet, a wearable device, or any other suitable electronic device.

The synchronous acquisition method may have relevance in acquisition time. The relevance in the acquisition time may include in at least one of the following:

the first biometric information and the second biometric information may be synchronized to start collecting;

the first biometric information and the second biometric information may be synchronized to end collecting;

an acquisition time of the first biometric information and an acquisition time of the second biometric information may partially overlap;

a difference between the acquisition time of the first biometric information and the acquisition time of the second biometric information may be in a specific time difference; and the acquisition time of the first biometric information and the acquisition time of the second biometric information may be in a same acquisition time window which may correspond to a working period of an image acquisition module.

The synchronous acquisition method may include a simultaneous acquisition method where the acquisition may start at a same time point and end at another same time point, or an equivalent acquisition method where an acquisition of the first biometric information and an acquisition of the second biometric information may end in a specific time period.

For user perception, in the synchronous acquisition method, the first biometric information and the second biometric information may be captured in one single time, instead of in multi-times. Correspondingly, for a user, the first biometric information and the second biometric information may be captured synchronously and the predetermined object may only approach the image acquisition module once instead of twice or more.

Both the simultaneous acquisition method and the equivalent acquisition method may be performed with a single image acquisition module, or with two or more image acquisition modules disposed closely enough in the space.

In the present disclosure, the first biometric information and the second biometric information of the predetermined object may be captured by the synchronous acquisition method. The first biometric information and the second biometric information may be different biometric information corresponding to different biometric characterizations of the predetermined object. The first biometric information and the second biometric information further may be the biometric information in a same area (i.e., a target area) of the predetermined object. Both the first biometric information and the second biometric information may be captured by an image acquisition process, and may be reflected in images after the acquisition.

In some embodiments, the first biometric information and the second biometric information may be different characterizations of a same type biometrics. In some other embodiments, the first biometric information and the second biometric information may be different types of biometrics. For example, the first biometric information and the second biometric information may reflect biometric information of different parts of the predetermined object, or may reflect biometric information at different levels of the predetermined object.

In one embodiment, the first biometric information and the second biometric information may be the biometric information reflecting different types of biometrics in the target area of the predetermined object or reflecting different biological structures in the target area.

In S102, the biometric authentication may be performed to perform a biometric authentication on the predetermined object by combining the first biometric information and the second biometric information, instead of by using a single biometric information. In comparison with a single biometric authentication, an accuracy of the biometric authentication may be improved since more biometric information may be introduced in the present disclosure. Since the first biometric information and the second biometric information may be captured by the synchronous acquisition method, the predetermined object (i.e., a user) may only approach the image acquisition module once or enter an acquired state once. Two or more image acquisition may be avoided, and the acquisition process may be simplified to improve the user experience.

In some embodiments, S110 may include capturing an image of a first target and an image of a second target by the synchronous acquisition method.

A distance between the first target and the image sensor may be different from a distance between the second target and the image sensor.

In one embodiment, the first target and the second target in the image-acquiring target area may be different objects, and usually may correspond to different biological parts of a biological body.

In one embodiment, the target area may be an area of the predetermined object in a first plane. The first target and the second target may be different acquiring objects of the target area in different positions of a second plane. The second plane may be perpendicular to the first plane and may be perpendicular to a plane of the image sensor.

In one embodiment, the distance between the first target and the image sensor may be different from the distance between the second target and the image sensor. The distance between the first target and the image sensor may be a first distance, and the distance between the second target and the image sensor may be a second distance. The first distance may be different from the second distance. The first distance may be greater than or smaller than the second distance.

Correspondingly, by using the synchronous acquisition method, images of the first target and the second target with different distances from the image sensor may be acquired synchronously in an acquiring time window or in a time difference insensible to the user.

In one embodiment, when using the simultaneous acquisition method, different image acquisition modules may be used to acquire the biometric information, or a single image acquisition module which can clearly acquire the first target and the second target at different distances simultaneously may be used. In some other embodiments, when using the equivalent acquisition method, different image acquisition modules may be used for a multiplexing image acquisition, or a single image acquisition module may be used for the multiplexing image acquisition. For example, the single image acquisition module may acquire the first biometric information from the first target and the second biometric information from the second target respectively in a short time difference by changing the focus. In some embodiments, with image acquisition modules using the pinhole imaging principle, a clear image of the first target and a clear image of the second target may be acquired without changing the focus.

In the present disclosure, the image acquisition modules may capture a clear image of the first target and a clear image of the second target to complete acquiring the first biometric information and the second biometric information.

In some embodiments, the first target may be located at an outer surface of the predetermined object and the second target may be located inside the outer surface of the predetermined object. For example, the first biometric information corresponding to the first target may be a body surface feature of the predetermined object and the second biometric information corresponding to the second target may be a vivo feature of the predetermined object.

In some embodiments, the first target may be textures of skins and the second target may be blood vessels inside the skins, muscle tissues or bones. The first biometric information acquired by capturing the image of the first target may be fingerprints, and the second biometric information acquired by capturing the image of the second target may be a geometry feature of the blood vessels, a geometry feature of the muscle tissues, or a geometry feature of the bones. The geometry feature may be any feature reflecting a profile, a spatial distribution, or a size of the second target.

In one embodiment, the second biometric information may include the distribution of the blood vessels, such as whether the blood vessels cross each other, positions of the crossing of the blood vessels, or thickness of the blood vessels. In some other embodiments, the second biometric information may include an extending direction of a bone, a thickness of the bone, or a bending feature of the bone.

For description purposes only, the above embodiments with the first biometric information and the second biometric information are used as an example to illustrate the present disclosure, and should not limit the scopes of the present disclosure.

In some embodiments, S110 may include acquiring the first biometric information of the target area by the image capture using light at a first wavelength and acquiring the first biometric information of the target area by the image capture using light at a second wavelength different from the first wavelength.

The difference between the second wavelength and the first wavelength may induce a difference in the light at the first wavelength and the light at the second wavelength, including at least one of a difference between a penetration of the light at the first wavelength and a penetration of the light at the second wavelength, a difference between a visibility of the light at the first wavelength and a visibility of the light at the second wavelength to human eyes, a difference between a light-emitting device for the light at the first wavelength and a light-emitting device for the light at the second wavelength, a difference of a reflection index/absorption index of the light at the first wavelength and a reflection index/absorption index of the light at the second wavelength with respect to a same object.

In some embodiments, the light at the first wavelength may be visible light, and the light at the second wavelength may be infrared light or ultraviolet light. In some other embodiments, the light at the first wavelength may be infrared light or ultraviolet light, and the light at the second wavelength may be visible light.

In some embodiment, the light at the first wavelength may be used to acquiring the first biometric information, and the light at the second wavelength may be used to acquiring the second biometric information. Light at different wavelengths may be used to acquire different biometrics corresponding to two biometric information, and correspondingly clear images may be captured to reflect the biometrics with different types or different structures.

In some embodiments, the visible light may be used to acquire the body surface feature of the predetermined object, and the invisible light including the infrared light may be used to acquire the vivo feature of the predetermined object. For example, the infrared light may be used to acquire features of the blood vessels, muscles, and/or bones inside the skins, and the visible light may be used to acquire features of the skins. The features of the skins may include textures of the skins and color features of the skins. The color features of the skins may include features reflecting skin colors of the predetermined object which determine the overall skin color of the predetermined object is white, yellow, or black.

The body surface of the predetermined object may have pigmentations including moles with black, brown, or some other color. A random distribution of the pigmentations in humans may also be used as biometric information for the biometric authentication. Correspondingly, in some embodiments, the color features may also include pigmentation features in the target area. The pigmentations may induce a visible color difference between the local skin color and the color of the skin around the pigmentations, for example, partial whitening or partial darkening.

In one embodiment, S110 may include: acquiring an image of the target area to obtain a first image including the first biometric information in a first time period of the acquiring time window; and acquiring an image of the target area to obtain a second image including the second biometric information in a second time period of the acquiring time window. The first time period may be different from the second time period.

The first image and the second image may be acquired in different time segments in the acquiring time window. A difference between the first time segment and the second time period may include that at least one time period includes a time point that is not located in another time period. Correspondingly, the first time period and the second time period may partially overlap or completely not overlap with each other in the time domain.

In the present embodiment, the first image and the second image corresponding to the two biometric information respectively may be acquired in different time segments in the acquiring time window. The first image and the second image may correspond to different image files.

In some embodiments, the first time period and the second time period may be two time periods orthogonal to each other in the time domain. For example, the two time periods orthogonal to each other may be time periods that do not overlap at all.

In one embodiment, S110 may include acquiring an image of the target area to obtain a third image. The third image may contain the first biometric information and the second biometric information simultaneously.

In the present embodiment, the third image containing the first biometric information and the second biometric information simultaneously may be acquired by using the simultaneous acquisition method to acquire the image of the target area. Correspondingly, the electronic device may obtain the third image containing the first biometric information and the second biometric information simultaneously through one acquisition. And the first biometric information and the second biometric information may be extracted out from the third image simultaneously.

In some embodiments, the method may further include:

S111: extracting the first image of the first biometric information and the second image of the second biometric information from the third image based on the geometry features of the first biometric information and the second biometric information.

S120 may include S121: performing the biometric authentication on the predetermined object based on the first image and the second image.

In the present embodiment, the first biometric information and the second biometric information may be extracted out from the third image if the third image is acquired by the simultaneous acquisition method. The first image of the first biometric information and the second image of the second biometric information from the third image based on the geometry features of the first biometric information and the second biometric information. For example, by using the fingerprint texture and the biometric information of the blood vessels at a finger as an example, the fingerprint texture and size (thickness) of the blood vessels are different. Also, shapes of the fingerprint texture (rotation modes) may be different from extending modes of the blood vessels.

Then, images corresponding to two different biometric information may be extracted from a same image.

In some embodiments, deep learning models (such as neural networks) may be used to train a process for extracting the first biometric information and the second biometric information from the third image. Subsequently, the acquired third image may be input to the deep learning models to extract the first biometric information and the second biometric information. The deep learning models may be achieved by training with training samples which reflect the geometry features of the first biometric information and of the second biometric information. Correspondingly, the first image of the first biometric information and the second image of the second biometric information may be extracted based on the geometry features of the two biometric information.

In some embodiments, S110 may include: acquiring the first biometric information and the second biometric information using one image acquisition module.

The first biometric information and the second biometric information may be acquired using one image acquisition module. In one embodiment, the first biometric information and the second biometric information may be acquired by a multiplexing acquisition process in one acquiring window with the one image acquisition module. In some other embodiments, the first biometric information and the second biometric information may be acquired simultaneously in one acquiring time window with one image acquisition module.

In some embodiments, S120 may include: matching the first biometric information with a first preset feature, to obtain a first authentication result, and matching the second biometric information with a second preset feature, to obtain a second authentication result.

If the first authentication result reveals that the first biometric information pass the authentication and the second authentication result reveals that the second biometric information passes the authentication, the predetermined object may pass the biometric authentication.

In the present disclosure, the first biometric information and the second biometric information may be authenticated independently. The first preset feature and the second preset feature may be pre-stored in the electronic device, or the electronic device may receive the first preset feature and the second preset feature from other devices. In S120, two biometric information acquired by the image may be matched with the preset features. If the match is consistent, corresponding biometric information may be considered passing the authentication. Otherwise, the corresponding biometric information may be considered failing the authentication. In one embodiment, the biometric authentication may be considered passed only if both the first biometric information and the second biometric information match corresponding preset features consistently.

For example, when using the fingerprint authentication and the blood vessel authentication, the fingerprint authentication may be considered passed if M2 fingerprint features of M1 fingerprint features acquired in the first biometric information match the preset fingerprint features consistently. The blood vessel authentication may be considered passed if a matching value between the distribution features of the blood vessels and the preset distribution features reaches a preset match threshold. If both the fingerprint authentication and the blood vessel authentication is passed, the biometric authentication of the predetermined object may be considered passed.

Figure 3:
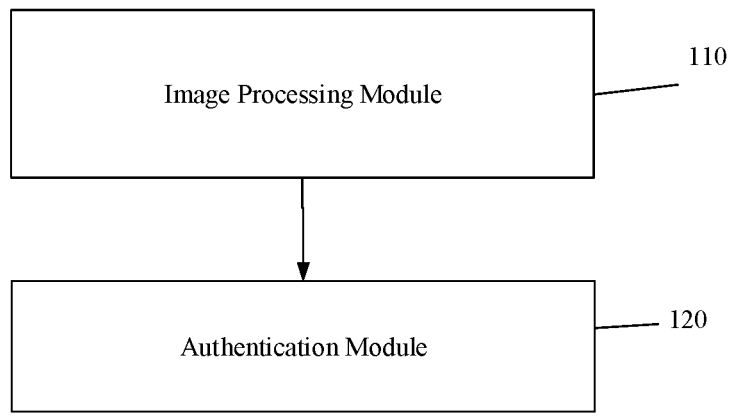
FIG. 3 illustrates an electronic device according to some embodiments of the present disclosure.

As illustrated in FIG. 3, the present disclosure may provide an electronic device. The device may include: an image processing module 110 for acquiring images of the first biometric information and the second biometric information in the target area of the predetermined object; and an authentication module 120 for performing a biometric authentication on the predetermined object by combining the first biometric information and the second biometric information.

In one embodiment, the image processing module and the authentication module 120 may be software modules. The software modules may achieve the acquisition of the first biometric information and the second biometric information, and the biometric authentication, after the software modules are executed by processors. For example, the electronic device may include a memory and a processor. The memory may be configured to store program instructions for performing the disclosed method. The processor may be coupled with the memory and, when executing the program instructions, configured for performing the disclosed method.

In some other embodiments, the image acquisition module and the authentication module 120 may be composite modules combining hardware and software. For example, some specific hardware may execute specific software to achieve the acquisition of the first biometric information and the second biometric information, and the biometric authentication. The composite modules may include complex programmable arrays and/or field-programmable arrays.

In some other embodiments, the image processing module 110 and the authentication module 120 may be hardware structures such as application-specific integrated circuits.

In one embodiment, the image processing module 100 may acquire images of the first target and the second target in the target area of the predetermined object. A distance between the first target and the image sensors may be different from a distance between the second target and the image sensors.

In some embodiments, the first target may be located at an outer surface of the predetermined object and the second target may be located in the outer surface of the predetermined object. For example, the first target may be textures of skins and the second target may be blood vessels inside the skins, muscle tissues or bones.

In some embodiments, the image processing module 110 may acquire the first biometric information of the target area by the image capture using light at a first wavelength and acquiring the first biometric information of the target area by the image capture using light at a second wavelength different from the first wavelength.

In some embodiments, the image processing module 110 may acquire an image of the target area to obtain the first image containing the first biometric information in the first time period of the acquiring time window, and acquire an image of the target area to obtain the second image containing the second biometric information in the second time period of the acquiring time window. The first time period may be different from the second time period.

In some embodiments, the image processing module 110 may acquire an image of the target area to obtain the third image. The third image may contain the first biometric information and the second biometric information simultaneously.

In some embodiments, the device may further include an extraction module. The extraction module may extract the first image containing the first biometric information and the second image containing the second biometric information from the third image based on the geometry features of the first biometric information and the second biometric information.

The authentication module 120 may perform an authentication on the predetermined object based on the first image and the second image.

In some embodiments, the image processing module 110 may use one image acquiring module to acquire the first biometric information and the second biometric information based on the synchronous acquisition method.

In some embodiments, the authentication module 120 may match the first biometric information with a first preset feature, to obtain a first authentication result, and match the second biometric information with a second preset feature, to obtain a second authentication result. If the first authentication result reveals that the first biometric information pass the authentication and the second authentication result reveals that the second biometric information passes the authentication, the predetermined object may pass the biometric authentication.

For description purposes only, the following embodiments with electronic devices or image processing modules for achieving the information processing methods provided by above embodiments will be used as examples to illustrate the present disclosure and should not limit the scopes of the present disclosure. In various embodiments, any suitable electronic devices or image processing modules different from following electronic devices or image processing modules may be used. For example, a binocular camera with a small distance may be used to acquiring the first biometric information and the second biometric information simultaneously.

Figure 4:
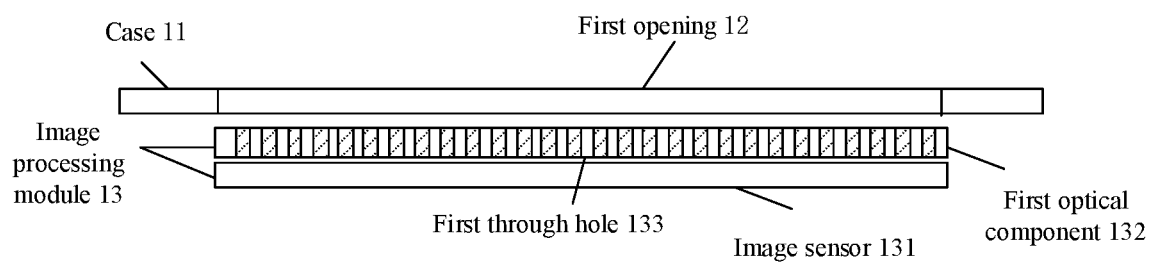
FIG. 4 illustrates another electronic device according to some embodiments of the present disclosure.

In one embodiment, the present disclosure provides an electronic device illustrated in FIG. 4. The device may include a case 11 with a first opening 12 and an image processing module 13 exposed by the first opening 12. The image processing module 13 may include an image sensor 131 for sensing/forming an image and a first optical component 132 including one or more first through holes 133. Light reflected by the predetermined object may be detected by the image sensor 131 to form an image through the one or more through holes 133. The predetermined object may be an object which can be placed at a side of the first optical component 132, and the image sensor 131 may be disposed at a second side of the first optical component 132. The first side may be opposite to the second side.

In one embodiment, the electronic device may be any electronic device including the image processing module 13, such as a portable device including a cell phone, a tablet, a wearable device, a fixed device with a camera. In other embodiments, the electronic device may be a self-moving device such as a robot flying at a low altitude or a robot running at a low level.

In one embodiment, the case 11 may be a support case for the electronic device, such as an outer shell of a portable device including a cell phone.

The image sensor 131 in the image processing module 13 may detect light from the acquiring object (reflected light) through the first opening 12 in the case 11, for sensing and forming the image.

In some embodiments, when the imaging device is a bar-type cell phone, a tablet, or a wearable device with function keys such as a home key and a return key independent of the display screen, the first opening 12 may be used to accommodate the function keys, and the image processing module 13 may be disposed as a component of the function keys and may be independent of the display screen.

Figure 5:
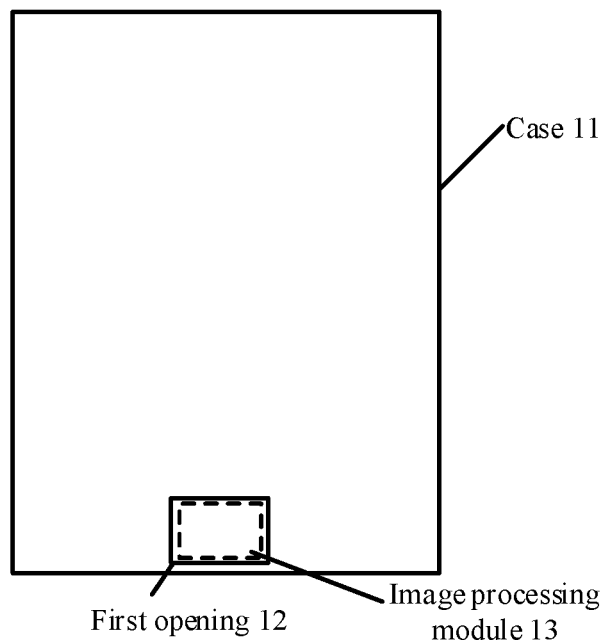
FIG. 5 illustrates another electronic device according to some embodiments of the present disclosure.

In some other embodiments illustrated in FIG. 5, the imaging device may include a full screen with a screen ratio larger than a preset threshold value, and the function keys may not be disposed in the imaging device, the first opening 12 may be disposed at any position of the imaging device. For example, the first opening 12 may be disposed close to a bottom of the imaging device.

In some embodiments, the image sensor 131 may use a photoelectric conversion device to convert an optical image on a photosensitive surface into an electrical signal corresponding to the optical image, and then may generate an image based on the electrical signal. In some embodiments, the image sensor 131 may include devices with a capability of sensing/forming images such as charge-coupled devices (CCD) or complementary metal-oxide-semiconductor (CMOS) devices.

In one embodiment, the device may further include the first optical component 132 with the one or more first through holes 133. Light reflected by the predetermined object may be transmitted to the image sensor 131 to form an image through the one or more through holes 133. The image sensor 131 may convert the detected optical signal to the electrical signal to achieve sensing/forming of images.

In some embodiments, a thickness at any position between the front surface and the back surface of the first optical component 132 may be consistent or uniform, rather than a convex lens which is thicker in the middle and thin at two sides. Assembly of the image processing module 13 may be simplified.

In one embodiment, the predetermined object and the image sensor 131 may be at two opposite sides of the first optical component 132. Light reflected by the predetermined object may be projected to the image sensor 131 through the one or more first through holes 133 by a pinhole imaging process.

In the present disclosure, the first optical component 132 may form the image through the one or more first through holes 133. In comparison with forming images through lenses, a thickness of the first optical component 132 may be reduced significantly but the clear image may be still formed. Correspondingly, an overall thickness of the image processing module 13 may be reduced to achieve the thinner/lighter electronic device.

Further, in the present disclosure, the image may be formed at the image sensor 131 by the first optical component 132 using the pinhole imaging process. A focusing process necessary when imaging by a lens may be simplified, and a poor image induced by an inaccurate focus may be avoided. Quality of the image may be improved.

In some embodiments, the image processing module 13 may be a finger acquisition module. The finger acquisition module may use the one or more first through holes 133 in the first optical component to help the image sensor 131 to image. When the finger acquisition module includes a strong enough light source with a single wavelength or with two wavelengths (such as a visible light source and an infrared light source), the finger acquisition module may capture the fingerprint image at the surface of the finger, images of veins under the skin of the fingerprint, images of muscles under the skin of the fingerprint, or images of bones under the skin of the fingerprint.

In some embodiments, the image processing module 13 may further include a light-emitting device to generate incident light in the acquisition area. Correspondingly, when the predetermined object approaches or enters the acquisition area, corresponding reflected light may be formed based on the incident light.

In some other embodiments, the imaging light source of the image processing module 13 may be ambient light, and the image processing module 13 may not include a light-emitting device. In other embodiments, a light-emitting device may be disposed in the image processing module 13 to enable the image processing module 13 to form the image with insufficient ambient light. The light-emitting device may provide the incident light to the acquisition module, for forming the reflected light by reflecting the incident light by the predetermined object. The reflective light then may be projected to the image sensor. For example, the light-emitting device may emit light to the acquisition region. If an object is located in the acquisition area, the object may be considered as the predetermined object and may be detected to form an image.

In one embodiment, the incident light from the light-emitting device may be projected to the predetermined object through the first optical component 132. In some other embodiments, the incident light from the light-emitting device may be projected to the predetermined object directly without passing the first optical component 132.

In the present disclosure, the light-emitting device may be disposed in the image processing module 13 to enable the image processing module 13 to form the image normally with insufficient ambient light.

In one embodiment, the light-emitting device may be disposed directly under the first light-emitting device or at a side of the first light-emitting device. The light may be transmitted to the predetermined object through the first light-emitting device.

Figure 6:
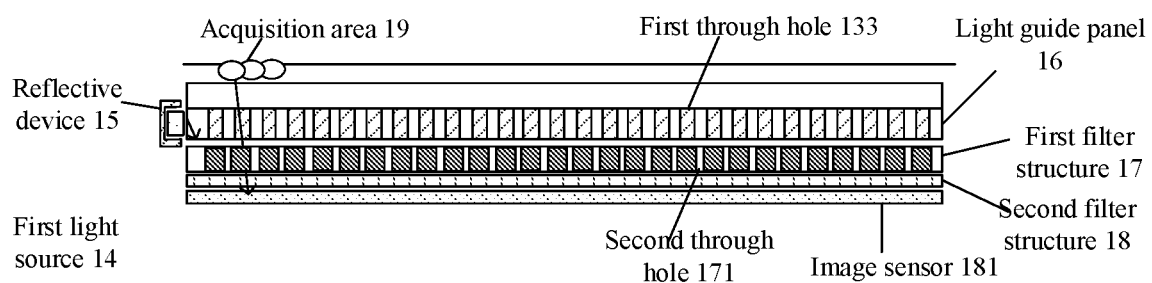
FIG. 6 illustrates another electronic device according to some embodiments of the present disclosure.

In one embodiment illustrated in FIG. 6, the light-emitting device may include a light guide plate 16 and a first light source 14 at a third side of the light guide plate 16.

The light guide plate 16 may be made of a material with a high reflectivity and a low light absorption, including an acrylic/PC board with an optical grade. Correspondingly, the light from the first light source 14 at the third side of the light guide plate 16 may be projected to the predetermined object through the light guide plate 16.

The first light source 14 may be disposed at the third side of the light guide plate 16, and may not block a first side and a second side of the light guide plate 16. Correspondingly, the first light source 14 may not interfere with a transmission of the light emitted by the first light source 14 to the acquisition area 19, and also may not interfere with the image sensor 131 from sensing the reflected light formed at the predetermined object.

In some embodiments, the light guide plate 16 may be a rectangular board with a specific thickness. The first side of the light guide plate 16 may be a side of a front surface of the rectangular board, and the second side of the light guide plate 16 may be a side of a back surface of the rectangular board. The third side may be a side of the rectangular board connecting the front surface with the back surface of the rectangular board.

The first light source 14 may be a light source of a display panel in the electronic device or a light source independent of the display panel in the electronic device.

In one embodiment illustrated in FIG. 6, the light-emitting device may further include a light reflection device 15. The light reflection device 15 may reflect the light emitted by the first light-emitting device 14 into the acquisition area 19 as much as possible, to reduce a requirement on a light-emitting intensity of the first light-emitting device 14.

In some embodiments, the electronic device may further include a preset sensor for detecting a presence of the predetermined object in the acquisition area and generating a detecting signal, and a processing module. The processing module may work with the preset sensor to control the light-emitting device to emit light when the detecting signal shows the presence of the predetermined object in the acquisition area.

In some embodiments, the preset sensor may be a distance sensor. The distance sensor may detect the presence of the predetermined object in the acquisition area by an infrared response.

In other embodiments, the preset sensor may be a touch sensor. The touch sensor may be a deformation sensor or a capacitance sensor. The touch sensor may detect the presence of the predetermined object in the acquisition area through deformation of the deformation sensor or a change of a capacitance of the capacitance sensor when the acquisition area is covered by the predetermined object. The deformation sensor may be a pressure sensor including a stress piece.

The processing module may control the light-emitting device to emit light. In the process, when the current light-emitting device is off (does not emit light), the processing module may turn on the light-emitting device to emit light. When the current light-emitting device emits light but the emitted light meets a requirement for acquiring the image, the processing module may not control a switch of the light-emitting status of the light-emitting device, to maintain light emitting of the light-emitting device. When the current light-emitting device emits light but the emitted light does not meet a requirement for acquiring the image, the processing module may adjust the light emission of the light-emitting device, to make the emitted light from the light-emitting device after the adjustment meets the requirement for acquiring the image.

The requirement on the light-emitting status for acquiring the image may include at least one of a brightness of the emitted light meeting a requirement on the brightness for acquiring the image, a chromaticity of the emitting light meeting a requirement on the chromaticity for acquiring the image, a wavelength of the emitted light meeting a requirement on the wavelength for acquiring the image, and a direction of the emitted light meeting a requirement on the direction for acquiring the image.

In some embodiments, the first optical component 132 may include a light guide plate 16 and the one or more first through holes 133 may be disposed in the light guide plate 16.

In one embodiment, the first optical component 132 may be the light guide plate 16 with the one or more first through holes 133. The one or more first through holes 133 may be disposed in an area of the first opening 12.

The light guide plate 16 may guide the light emitted by the first light source 14 to the predetermined object, and the one or more first through holes 133 in the light guide plate 16 may be used to detect the reflected light from the predetermined object, to form the image. A single structure of the light guide plate 16 may guide the light and form the image simultaneously. The structure may be simple and delicate. The thickness of the image processing module 13 may be reduced further.

Figure 8:
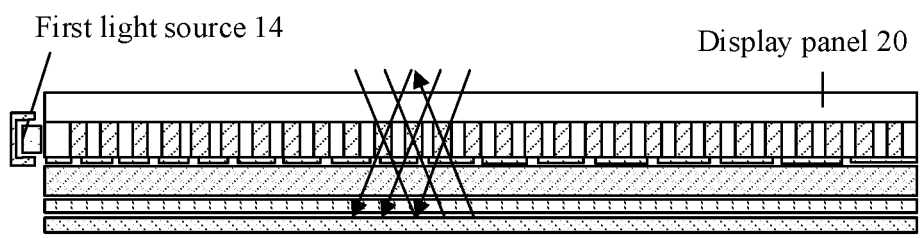
FIG. 8 illustrates another electronic device according to some embodiments of the present disclosure.
Figure 9:
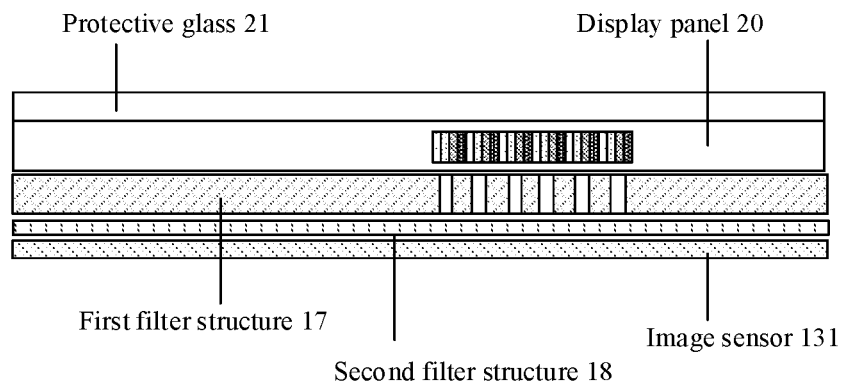
FIG. 9 illustrates another electronic device according to some embodiments of the present disclosure.

In some embodiments illustrated in FIG. 8 and FIG. 9, the electronic device may further include a display panel 20 for displaying images. At least a portion of the display panel 20 may be used as the light-emitting device.

In various embodiments, the display panel may be any suitable display panel such as a liquid crystal display panel or an organic light-emitting diode (OLED) display panel.

The display panel may be a self-luminous device and may be used as a light source for the image acquisition. For example, the display panel may be used as the first light source 14, to provide light necessary for the image sensor 131 to detect and form the image.

Different display panels may have different light sources. For example, a liquid crystal display panel may include a liquid crystal module. The liquid crystal display panel may further include a side light source at a side of the liquid crystal module or a backlight source at a back of the liquid crystal module. The side light source and the backlight source may be used as the light-emitting device.

When the liquid crystal display panel includes the backlight source, the first optical component 132 may be a device with the one or more first through holes 133 made of a transparent material.

When the liquid crystal display panel includes the side light source, the first optical component 132 may be the light guide plate 16.

When the display panel is the OLED display panel, the first optical component 132 may be disposed above OLED lamps of the OLED display panel and may be a transparent device with the one or more first through holes 133.

In one embodiment, an area of the display panel may be larger than an area of the acquisition area, and a portion of the display panel corresponding to the acquisition area may be used as the light source of the light-emitting device for the image acquisition.

In some embodiments, to reduce an influence of light emitting of the display panel outside the acquisition area on the image acquisition, a portion of the display panel providing the incident light to the acquisition area may be turned on and another portion of the display panel not providing the incident light to the acquisition area may be turned off. Correspondingly, by using a visual persistence effect in a user, an interference with the image acquisition may be reduced, and a quality of the image acquisition may be improved.

In some embodiments, when using the display panel to provide the light source for the image acquisition, the light at only one wavelength is necessary. The light at the one wavelength may be the visible light, and at least pixels in the portion of the display panel corresponding to the acquisition area may emit the visible light including the white light or the yellow light.

Figure 7:
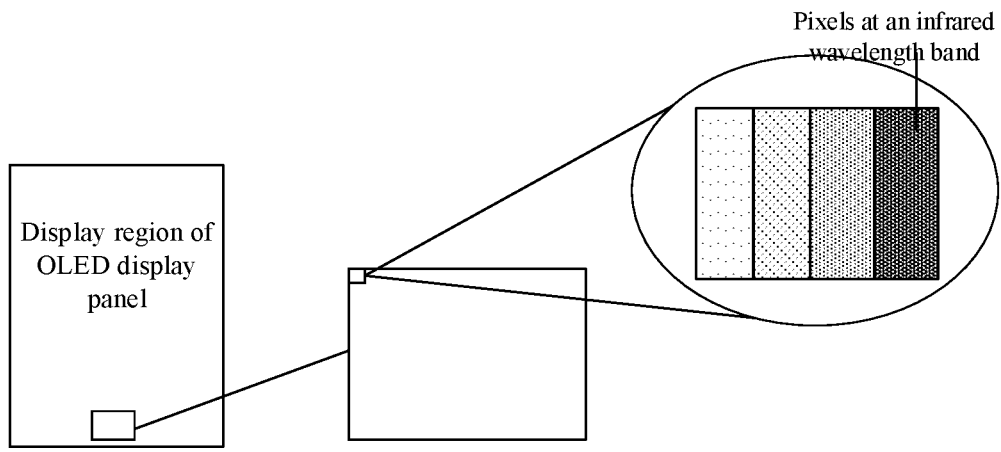
FIG. 7 illustrates another electronic device according to some embodiments of the present disclosure.

In some other embodiment, when using the display panel to provide the light source for the image acquisition, the light at two wavelengths may be necessary and the light may include the visible light and the invisible light. The light source of the invisible light may be disposed in gaps between the pixels of the display panel since the display panel usually emits the visible light. In the image acquisition, the pixels of the display panel in the acquisition area and the light source of the invisible light may emit light simultaneously. For example, in one embodiment, the invisible light may be the infrared light and the light source of the invisible light in the gaps between the pixels of the display panel corresponding to the acquisition area may be an infrared light source. As illustrated in FIG. 7, pixels in the infrared light band may be disposed in the display region of the OLED display panel as the invisible light source.

In some other embodiments, the invisible light source may be disposed at a side surface of the light guide plate 16 instead of in the gaps between the pixels of the display panel.

As illustrated in FIG. 8, the display panel 20 may provide the visible light, and the first light source 14 may provide the invisible light. For example, the first light source may provide infrared light.

In some embodiments, a protective glass 21 may disposed above the display panel 20 to protect the display panel 20.

In some embodiments, the acquisition area may be a display area corresponding to a whole display surface of the display panel. The predetermined object may be placed at any position of the display panel for the image acquisition. Correspondingly, it is unnecessary to place the fingers in a specific area when acquiring fingerprints of the user, to achieve the image acquisition. The process for the image acquisition may be simplified, and a user experience may be improved.

In some embodiments, the light-emitting device may include a first light source and a second light source.

The first light source may emit the light at the first wavelength and the light at the first wavelength may be used for forming the image of the first target in the predetermined object.

The second light source may emit the light at the second wavelength and the light at the second wavelength may be used for forming the image of the second target in the predetermined object.

The first wavelength may be different from the second wavelength.

In one embodiment, the distance between the first target and the image sensor 131 may be a first distance, and the distance between the second target and the image sensor 131 may be a second distance. The first distance may be different from the second distance. In some other embodiments, the first target may be located at an outer surface of the predetermined object and the second target may be located inside the outer surface of the predetermined object.

In the present disclosure, the light-emitting device may include at least two light sources: the first light source and the second light source. Difference between the first light source and the second light source may at least include a different between the wavelengths of two light sources. In some embodiments, light-emitting devices in the first light source may be different from light-emitting devices in the second light source.

In some embodiments, a penetration of the light at the first wavelength may be different from a penetration of the light at the second wavelength.

In some embodiments, the light at the first wavelength may be the visible light and the light at the second wavelength may be the infrared light. In some other embodiments, the light at the first wavelength may be the infrared light and the light at the second wavelength may be the visible light.

In some embodiments, the light at the first wavelength may be the visible light and the light at the second wavelength may be the ultraviolet light. In some other embodiments, the light at the first wavelength may be the ultraviolet light and the light at the second wavelength may be the visible light.

For description purposes only, the above embodiments with two types of lights are used as examples to illustrate the present disclosure and should not limit the scopes of the present disclosure.

In some embodiments, the image processing module 13 may further include a first filter structure 17. The first filter structure 17 may be disposed between the first optical component 132 and the image sensor 131, to block the light incident on the image sensor 131 at a first preset angle.

In one embodiment, the first filter structure 17 may be disposed between the first optical component 132 and the image sensor 131, to block the light incident on the image sensor 131 at a large angle. For example, the first filter structure 17 may filter out the light incident on the image sensor 131 at an angle outside a range between about 80 degrees and about 100 degrees. The light incident on the image sensor 131 at an angle outside a range between about 80 degrees and about 100 degrees may be stray light and may interfere with the clear image acquisition of the predetermined object by the image sensor 131. By filtering out the light incident on the image sensor 131 at the first preset angle, the quality of the image acquisition may be improved.

As disclosed, the first preset angle outside a range between about 80 degrees and about 100 degrees is illustrated as an example, any other suitable angles may be used for the first preset angle including, an angle outside a range between about 70 degrees and about 110 degrees, or an angle outside a range between about 85 degrees and about 95 degrees. In a specific example, the first filter structure 17 disposed between the first optical component 132 and the image sensor 131 may allow the light incident on the image sensor 131 at an angle of about 90 degrees to transmit.

In some embodiments, the first filter structure 17 may contain one or more second through holes 171. The light incident on the image sensor 131 at a second preset angle may transmit through the one or more second through holes 171, and an area of the first filter structure 17 other than the one or more second through holes 171 may block the light incident on the image sensor 131 at the first preset angle.

The one or more second through holes 171 may allow the light at an incident angle other than the first preset angle (e.g., may allow the light at an angle within a range between about 80 degrees and about 100 degrees, or within a range between about 70 degrees and about 110 degrees, or within a range between about 85 degrees and about 95 degrees, or at an angle of about 90 degrees) to be transmitted to the image sensor 131, and the first filter structure 17 may filter out the light incident on the image sensor 131 at the first preset angle by blocking.

In some embodiments, an aperture of the one or more second through holes 171 may be slightly smaller than an aperture of the one or more first through holes 133, and each of the one or more second through holes 171 may be aligned with a corresponding first through hole 133 of the one or more first through holes 133. Correspondingly, the light reflected by the predetermined object may pass the one or more second through holes 171 and incident on the image sensor 131. The area of the first filter structure 17 other than the one or more second through holes 171 may block the light to achieve a filter function.

In some embodiments, the first optical component 132 may be made of a first optical material, and the first filter structure 17 may be made of a second optical material different from the first optical material.

The optical component may be made of the second optical material with a filter function may filter out the light at the first preset angle. For example, a polarizer may be used to block the light at the first preset angle from arriving at the image sensor 131.

In some embodiments, the aperture of the one or more second through holes 171 may be smaller than the aperture of the one or more first through holes 133, and/or each of the one or more second through holes 171 may be aligned with the corresponding first through hole 133 of the one or more first through holes 133.

In one embodiment, an alignment between each of the one or more second through holes 171 and the corresponding first through hole 133 may be that a distance from a hole center line of each of the one or more second through holes 171 to a hole centerline of the corresponding first through hole 133 is smaller than a preset distance. For example, the hole center line of each of the one or more second through holes 171 may overlap the hole centerline of the corresponding first through hole 133. In other embodiments, an edge of each of the one or more second through holes 171 may be located in the corresponding first through hole 133.

For description purposes only, the above embodiments with the alignment between each of the one or more second through holes 171 and the corresponding first through hole 133 are used as examples to illustrate the present disclosure and should not limit the scopes of the present disclosure.

In some embodiments, the image processing module 13 may further include a second filter structure 18 for filtering out the light at a third wavelength.

The second filter structure 18 and the first filter structure 17 may be disposed at different sides of the first optical component, or the second filter structure 18 may be disposed between the first filter structure 17 and a layer of the image sensor 131.

The second filter structure 18 may filter out light at an interference wavelength. For example, the third wavelength may be different from the first wavelength and the second wavelength. For example, when the first wavelength may be the visible light wavelength and the second wavelength may be the infrared wavelength, the third wavelength may be neither the visible light wavelength nor the infrared wavelength. By filtering out the third wavelength which is not for forming the image, the clarity of the image and the quality of the image acquisition may be improved further.

The second filter structure 18 may include any suitable optical filters. The light at a specific wavelength band such as the first wavelength and/or the second wavelength may be guaranteed to transmit. The light at the third wavelength may be prevented from arriving at the image sensor by reflection, refraction, absorption, another optical effect, or a combination thereof. The clarity of the image and the quality of the image acquisition may be improved further.

In some other embodiments, the image processing module 13 may further include a third filter structure for filtering out the light at the third wavelength.

The third filter structure and the image sensor 131 may be disposed at different sides of the first optical component, or the third filter structure and the image sensor 131 may be disposed at a single same side of the first optical component.

In one embodiment, the third filter structure and the second filter structure 18 may be any suitable optical component with a same structure and a same function including any suitable optical films. The third filter structure and the second filter structure 18 may be disposed at different positions in the image processing module 13.

In some embodiments, the image processing module 13 may further include a processing module connected to the image sensor 131. The processing module may process the imaged formed by the image sensor 131.

The processing module may be a device with an information processing functionality, such as a microprocessor, a digital signal processor, an application processor, a programmable array, or an application-specific integrated circuit.

The processing module may be connected to the image sensor 131 and may process the imaged formed by the image sensor 131. In one embodiment, an image processing procedure executed by the processing module in the image processing module 13 may be referred to as a first image processing procedure. The first image processing procedure may include a procedure to improve the quality of the image. In one embodiment, if a plurality of images is acquired, one of the plurality of images with a good clarity may be selected out and be transmitted to other processors except the image processing module 13. In some other embodiments, the processing module may crop the image and transmit the cropped image.

In some embodiments, the first image processing procedure may include at least one of: a pre-processing of an image recognition, and the image recognition. The pre-processing of the image recognition may include an interference filtering process, and a separation process of different recognition targets in the image. The image recognition may include a matching process of the recognition targets, and an identification process of the recognition targets.

In some embodiments, the image processing module 13 may acquire the first target and the second target in one image, and a separation process on the images of the first target and of the second target may be performed on the same single image. For example, the first target and the second target may be separated based on the geometry features of the first target and of the second target.

The geometry features may include but not be limited to shape and/or size. For example, when the first target is a fingerprint and the second target is blood vessels, the geometry features used to separate the first target and of the second target may include a thickness of the textures and a mode of the textures.

In some embodiments, the separation process between the first target and the second target may further include separating the first target from the second target based on the color features of the first target and of the second target. For example, when forming the image using the visible light at a high brightness, the fingerprint and the blood vessels inside the skin may exhibit different color, and the first target and of the second target may be separated according to the color.

After the separation process of different identification targets by the processing module, a receiving end may receive the images of different targets and subsequent processes may be expedited.

The first image processing procedure may further include an image identification process. For example, different identification targets may be used for the authentication. In one embodiment, the processing module may complete the match automatically and finish the authentication of the object directly, to achieve a target identification and authentication results.

In some embodiments, the electronic device may further include a processing device connected to the image processing module 13. The processing device may execute a first image processing procedure and/or a second image processing procedure. The second image processing procedure may be different from the first image processing procedure.

A different between the processing device and the processing module may include at least one of: a different between a working frequency of the processing device and a working frequency of the processing module, a difference between a power consumption of the processing device and a power consumption of the processing module smaller than the power consumption of the processing device, a difference between a processing capability of the processing device and a processing capability of the processing module smaller than the processing capability of the processing device, and a difference between a processing speed of the process device and a processing speed of the processing module slower than the processing speed of the processing device.

A difference between the first image processing procedure and the second image processing procedure may include at least one of: a difference between a computational amount of the first image processing procedure and a computational amount of the second image processing procedure larger than the computational amount of the first image processing procedure, and a difference between a computational complexity of the first image processing procedure and a computational complexity of the second image processing procedure higher than the computational complexity of the first image processing procedure.

In some embodiments, the processing device may be consist of large integrated circuits, and the processing module may be formed by integrated circuits with an integration level smaller than the integrated circuits in the processing device or with devices less than devices in the integrated circuits in the processing device.

In some embodiments, the processing device may be a high-performance processor including a central processor, an image processor, or a quantum processor. The processing module may be any microprocessor or embedded processor.

For description purposes only, the above embodiments with the processing module and the processing device are used as examples to illustrate the present disclosure and should not limit the scopes of the present disclosure. For example, in some embodiments, the processing module may be a slave device of the processing device and the processing device may be a master device of the processing module to control operation of the processing module.

In some embodiments with at least two first through holes 133, the different first through holes 133 may be disposed in a configuration to make sensing areas of a same area in the predetermined object corresponding to the image sensor 131 through different first through holes 133 overlap.

For example, a plurality of first through holes 133 may be used to image a same single area of the predetermined object. To avoid an interference between images formed through different first through holes 133, the images of a same single area of the predetermined object formed through different first through holes 133 may overlap on the image sensor 131. An image ghosting may be avoided and the image quality may be improved.

When forming the electronic device, one or more parameters including a distance between different first through holes 133, a thickness of the first optical component 132, a distance between the image sensor 131 and the first optical component 132, and a distance from the acquisition area to the image sensor 131 and the first optical component 132 may be adjusted to make the images of a same single area of the predetermined object formed through different first through holes 133 overlap on the image sensor 131. The image ghosting may be avoided and the image quality may be improved.

Figure 10:
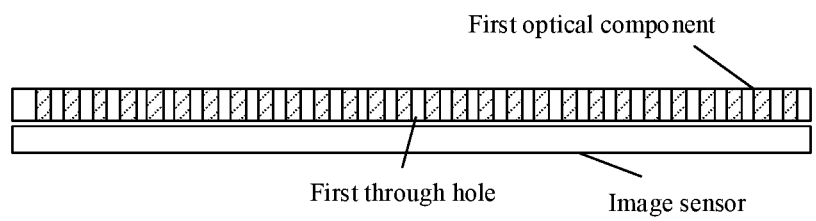
FIG. 10 illustrates an image processing module according to some embodiments of the present disclosure.

As illustrated in FIG. 10, the present disclosure also provides an image processing module. The image processing module may include: an image sensor for sensing and forming images, and a first optical component. The first optical component may include one or more first through holes. Light reflected by the predetermined object may be detected by the image sensor to form an image through the one or more through holes. The predetermined object may be an object which can be placed at a side of the first optical component, and the image sensor may be disposed at a second side of the first optical component. The first side may be opposite to the second side.

In one embodiment, the image sensor may be used for sensing and forming images, and may be a sensor including a CMOS device. The first optical component may be used to aid the imaging of the image sensor. In the present disclosure, the first optical component may form the image through the one or more first through holes using the pinhole imaging principle. In comparison with forming images through lenses, the lenses are unnecessary and the thickness of the image processing module may be reduced. Also, a focusing procedure may become unnecessary and a clear image may be formed without the focusing procedure when the predetermined object is located in the acquisition area. Correspondingly, when the predetermined object is located in the acquisition area, different parts of the predetermined object may still be imaged in a same single image even if the different parts of the predetermined object have different distance to the image sensor, or the different parts of the predetermined object with different distance to the image sensor can be imaged independently without a focusing procedure.

In some embodiments, the image processing module may further include a light-emitting device to provide incident light for imaging in the acquisition region.

When the predetermined object enters or is located in the acquisition, the reflected light may be formed based on the incident light.

In some embodiments, the light-emitting device may include a light guide plate and a first light source at a third side of the light guide plate. The light guide plate may be located in the first optical component and the one or more first through holes may be disposed in the light guide plate. The light guide plate may project the incident light from the first light source onto the first side of the light guide plate.

In some embodiments, the electronic device may further include a display panel for displaying images. At least a portion of the display panel may be multiplexed as the light-emitting device.

The light-emitting device may include a first-type light source and a second-type light source.

The first-type light source may emit the light at a first wavelength for forming the image of the first target in the predetermined object. The second-type light source may emit the light at a second wavelength for forming the image of the second target in the predetermined object. The first wavelength may be different from the second wavelength.

In one embodiment, the distance between the first target and the image sensor may be a first distance, and the distance between the second target and the image sensor may be a second distance. The first distance may be different from the second distance. In some other embodiments, the first target may be located at an outer surface of the predetermined object and the second target may be located inside the outer surface of the predetermined object.

In some embodiments, the image processing module may further include a filter structure. The filter structure may be disposed between the first optical component and the image sensor, to block the light incidenting on the image sensor at a first preset angle.

In some embodiments, the filter structure may include a first filter structure, and one or more second through holes may be disposed in the first filter structure. The light incident on the image sensor at a second preset angle may transmit through the one or more second through holes, and an area of the first filter structure other than the one or more second through holes may block the light incident on the image sensor at the first preset angle. In some other embodiments, the first optical component may be made of a first optical material, and the first filter structure may be made of a second optical material different from the first optical material. An aperture of the one or more second through holes may be slightly smaller than an aperture of the one or more first through holes. And/or each of the one or more second through holes may be aligned with a corresponding first through hole of the one or more first through holes.

In some embodiments, the image processing module may further include a second filter structure for filtering out the light at the third wavelength. The first filter structure and the second filter structure may be disposed at different sides of the first optical component, or the second filter structure may be disposed between the first filter structure and the image sensor.

In some embodiments, the image processing module may further include a third filter structure for filtering out the light at the third wavelength. The third filter structure and the image sensor may be disposed at different sides of the first optical component, or the third filter structure and the image sensor may be disposed at a same single side of the first optical component.

In some embodiments, the image processing module may further include a processing module connected to the image sensor. The processing module may be connected to the image sensor and may perform a first image processing procedure on the image formed by the image sensor. The first image processing procedure may include at least one of: a pre-processing of an image recognition, and the image recognition. The pre-processing of the image recognition may include an interference filtering process, and a separation process of different recognition targets in the image. The image recognition may include a matching process of the recognition targets, and an identification process of the recognition targets.

In some embodiments, when the light guide plate includes at least two first through holes, the different first through holes may be disposed in a configuration to make sensing areas of a same area in the predetermined object corresponding to the image sensor through different first through holes overlap.

Following several detailed examples of the image processing module or the electronic device based on various embodiments of the present disclosure will be illustrated.

Figure 11:
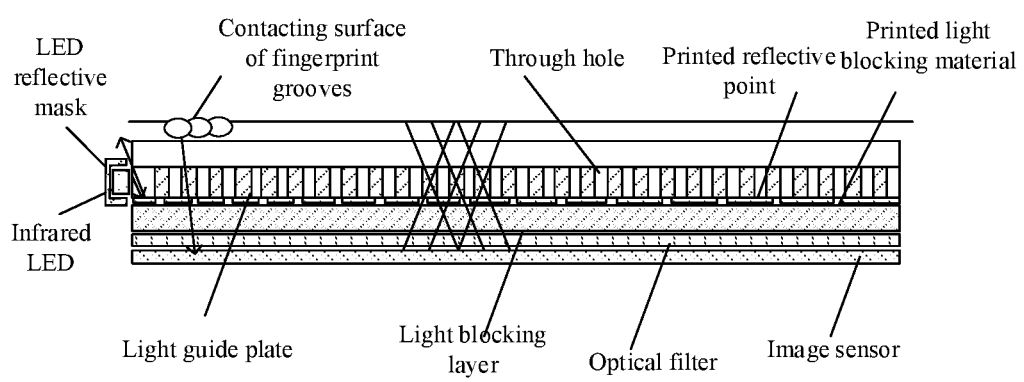
FIG. 11 illustrates another electronic device according to some embodiments of the present disclosure.
Figure 13:
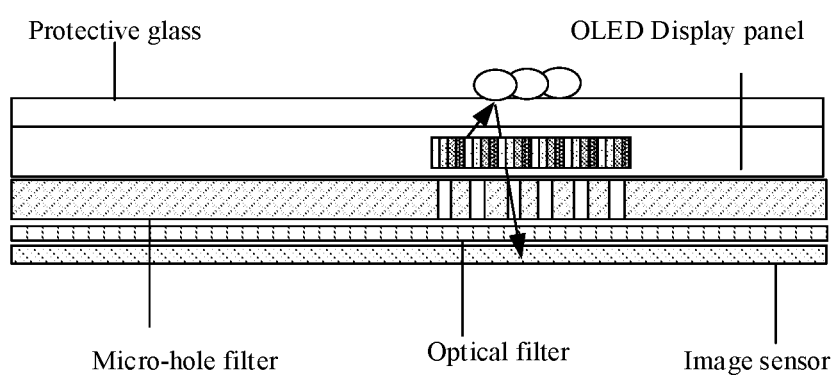
FIG. 13 illustrates another electronic device according to some embodiments of the present disclosure.

Example 1: as illustrated in FIG. 11 and FIG. 13, the image processing module or the electronic device may include an image sensor, an optical band filter, a light-blocking layer, a light guide plate, printed reflection point, printed light-blocking material parts, through holes, a protective module, a reflective mask, and an infrared light source.

The image sensor may receive the reflected light and form a gray-scale image for the biometric authentication.

The optical band filter may selectively transmit the light in a desired wavelength band. For example, the optical band filter may only transmit the light at a wavelength of about 940 nm to avoid an interference by the external ambient light at other wavelengths when using an infrared LED with a wavelength about 940 nm.

The light-blocking layer may correspond to the first filter structure. The light-blocking layer may filter an angle of the light so only the vertical light may enter and the stray light at a large angle (for example, with an angle outside the first preset angle) may be prevented from entering. An interference by the stray light may be avoided. The light-blocking layer may be disposed/formed in different ways. For example, the light-blocking layer may be a layer of an opaque material with a specific thickness including holes corresponding to the light guide plate. The light-blocking layer may be disposed directly on the image sensor, and may use a semiconductor fabrication process to limit and filter an angle of the incident light. The thickness of the module may be reduced further. The light-blocking layer may correspond to the first filter structure. When the first filter structure may be attached or formed by etching on the image sensor, the thickness of the image processing module may be reduced further.

The light guide plate may transmit the light from the light source (such as a LED) uniformly to a finger contact surface.

The printed reflection points may be printed on a bottom surface of the light guide plate and may have a good reflectivity. Correspondingly, the light from the light source at a side of the light guide plate may be transmitted to the whole acquisition area and then may be emitted from a front surface of the light guide plate. The front surface of the light guide plate may be a surface opposite to the bottom surface of the light guide plate.

The printed light-blocking material parts may be made of a material with a low reflectivity, and may also be disposed at the bottom surface of the light guide plate. A high reflectivity may induce an inhomogenous light guide. The printed light-blocking material parts may also prevent the light transmitted in the light guide plate from propagating downwards. An influence on imaging of the image sensor may be avoided.

The through holes corresponding to the one or more first through hole may be used for the pinhole imaging, and may be an imaging processing module for imaging without lenses. The through holes may also be a device to make the image sensor sensing and imaging. The through holes may have a highest priority. Regardless whether the printed reflective points or the printed light-blocking parts are formed, the through holes may be formed at the required coordinates by puncturing.

The protective module including a protective glass may be formed inside the acquisition area. The protective glass may be a transparent glass. The protective glass may be used as a placement reference (a position in the acquisition area) in the finger authentication, and may also function as packaging to block external vapors and dirties.

The reflective mask may correspond to the light reflecting device such as a LED reflective mask. The reflective mask may transmit the light from the light source to the acquisition area through the light guide plate as much as possible. A waste of the light may be avoided and a requirement on the light emitted by the light source may be reduced.

The infrared light source may be an infrared LED and may be used for artificial lighting. A wavelength of the infrared light source may prefer 940 nm, to avoid an interference by the infrared light in the sunlight.

Example 2: as illustrated in FIG. 13, Example 2 may provide an image processing module or an electronic device with two light sources, based on Example 1.

The image processing module may further include a visible LED, to emit light for the fingerprint part. The infrared LED may emit the infrared light at a stronger penetration capability for the vein part.

Figure 12:
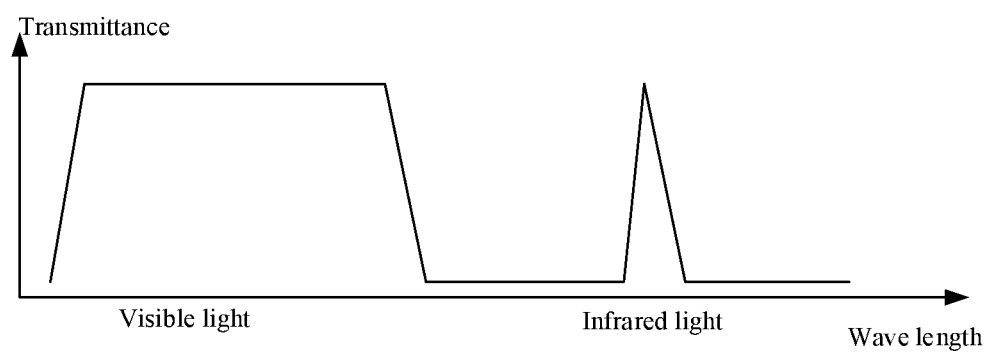
FIG. 12 illustrates a filter property of a double-channel filter according to some embodiments of the present disclosure.

Correspondingly, a design of the optical filter may be changed to have a high transmission range corresponding to the wavelength of the two LEDs. FIG. 12 illustrates a filter property of a double-channel filter. In FIG. 12, a horizontal axis is light wavelength and a vertical axis is a transmittance of the optical filter to different wavelengths. The optical filter in FIG. 12 may have a high transmittance in the visible wavelength band and in the infrared wavelength band, so the image sensor may form the image based on these two wavelengths.

Correspondingly, the image sensor may be a double-channel sensor for the visible light and the infrared light.

In the double-channel sensor, a portion of pixels may be excited by the visible light and another portion of the pixels may be excited by the infrared light mainly. The image sensor may use different pixels to form two images sequentially.

In some embodiments, the double-channel sensor may sample and process in a same frame time unit. In some other embodiments, the double-channel sensor may sample at different time by LEDs with corresponding wavelength bands.

The light sources with two wavelengths may be disposed at each side of the light guide plate respectively. Correspondingly, the light sources disposed inside the light guide plate may not block the light transmitting into the acquisition area, and also may not block imaging by the image sensor.

In some embodiments, the whole image processing module may be attached to a bottom of the OLED display panel, and the OLED display panel may at least provide the visible light source.

The OLED display panel can emit visible light by itself and may be used as the light source of the visible light wavelength band.

In some examples, the fingerprint identification module may be disposed under the OLED display panel, and correspondingly a portion of pixels in a portion of the OLED display panel may be configured as the light source of the infrared (IR) light.

The optical filter with microholes in FIG. 13 may correspond to the first filter structure and the microholes in the optical filter with microholes may correspond to the one or more second through holes.

For description purposes only, the above embodiments with the methods and devices are used as examples to illustrate the present disclosure and should not limit the scopes of the present disclosure. The methods and devices may be realized in any suitable way. For example, a division of the modules may only be a division of logical functions, and the actual implementation may use other division methods. For example, several units or components may be combined or integrated into another system. Some characterizations may be ignored or not executed. Couplings, direct couplings or communication connections between the components discussed above may be realized by interfaces. Indirect couplings or communication connections between the devices or units may be electrical connections, mechanical connections, or other connections.

The units discussed above as independent components may be or may not be physically separated. The units may be disposed in one position or in different network units. A portion of or all units may be chosen to achieve the objectives of the present disclosure according to actual needs.

All functional units in the various embodiments of the present disclosure may be integrated into one processing module. Or each unit may be configured as a single module, or two or more units may be integrated into one module. The modules may be achieved by hardware or hardware plus software functional units.

A portion of or all steps in the previous embodiments may be achieved by relevant hardware of program instructions. The program may be stored in a computer-readable storage medium. When executing the program, the portion or all steps in the previous embodiments may be executed. The storage medium may include a portable storage device, a read-only memory (ROM), a random access memory (RAM), a magnetic disk, a CD, or another medium that can store program codes.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An information processing method, comprising:
acquiring first biometric information including an image of a first target and second biometric information including an image of a second target of a predetermined object located in a target area by an image acquisition using a synchronous acquisition process wherein a distance between the first target and an image sensor is different from a distance between the second target and the image sensor and a distance between the first target and an image sensor is different from a distance between the second target and the image sensor;
and
performing a biometric authentication on the predetermined object by combining the first biometric information and the second biometric information of the predetermined object.

2. The method according to claim 1, wherein:
the first target is a skin texture and the second target includes blood vessels, muscle tissues, or bones under the skin.

3. The method according to claim 1, wherein acquiring the first biometric information and the second biometric information includes:
using light at a first wavelength to acquire the first biometric information in the target area by the image acquisition; and
using light at a second wavelength to acquire the second biometric information in the target area by the image acquisition, wherein the second wavelength is different from the first wavelength.

4. The method according to claim 1, wherein acquiring the first biometric information and the second biometric information includes:
acquiring the target area to obtain a first image including the first biometric information by the image acquisition in a first time period of an acquisition time window; and
acquiring the target area to obtain a second image including the second biometric information by the image acquisition in a second time period of the acquisition time window, wherein the first time period is different from the second time period.

5. The method according to claim 1, wherein acquiring the first biometric information and the second biometric information includes:
acquiring the target area simultaneously to obtain a third image by the image acquisition, wherein the third image include the first biometric information and the second biometric information simultaneously.

6. The method according to claim 5, further including:
extracting a first image including the first biometric information and a second image including the second biometric information from the third image, based on geometrical features of the first biometric information and the second biometric information, wherein performing the biometric authentication on the predetermined object by combining the first biometric information and the second biometric information includes:
performing the biometric authentication on the predetermined object based on the first image and the second image.

7. The method according to claim 1, wherein acquiring the first biometric information and the second biometric information includes:
using a single image acquisition module to acquire the first biometric information and the second biometric information based on the synchronous acquisition process.

8. The method according to claim 7, wherein performing the biometric authentication on the predetermined object by combining the first biometric information and the second biometric information includes:
matching the first biometric information with a first preset feature, to obtain a first authentication result;
matching the second biometric information with a second preset feature, to obtain a second authentication result; and
determining that the predetermined object passes the biometric authentication in response to the first authentication result indicating that the first biometric information passes an authentication and the second authentication indicating that the second biometric information passes an authentication.

9. An electronic device, comprising:
a memory, configured to store program instructions for performing a method for building images; and
a processor, coupled with the memory and, when executing the program instructions, configured to:
acquire first biometric information including an image of a first target and second biometric information including an image of a second target of a predetermined object located in a target area by an image acquisition using a synchronous acquisition process, wherein the first target is located at an outer surface of the predetermined object and the second target is located inside the outer surface of the predetermined object and a distance between the first target and an image sensor is different from a distance between the second target and the image sensor, and
perform a biometric authentication on the predetermined object by combining the first biometric information and the second biometric information.

10. The electronic device according to claim 9, wherein the first target is a skin texture and the second target includes blood vessels, muscle tissues, or bones under the skin.

11. The electronic device according to claim 9, wherein the processor is further configured to:
use light at a first wavelength to acquire the first biometric information in the target area by the image acquisition; and
use light at a second wavelength to acquire the second biometric information in the target area by the image acquisition, wherein the second wavelength is different from the first wavelength.

12. The electronic device according to claim 9, wherein the processor is further configured to:
acquire the target area to obtain a first image including the first biometric information by the image acquisition in a first time period of an acquisition time window; and
acquire the target area to obtain a second image including the second biometric information by the image acquisition in a second time period of the acquisition time window, wherein the first time period is different from the second time period.

13. The electronic device according to claim 9, wherein the processor is further configured to:
   acquire the target area simultaneously to obtain a third image by the image acquisition, wherein the third image include the first biometric information and the second biometric information simultaneously.

14. The electronic device according to claim 13, wherein the processor is further configured to:
   extract a first image including the first biometric information and a second image including the second biometric information from the third image, based on geometrical features of the first biometric information and the second biometric information,
   perform the biometric authentication on the predetermined object based on the first image and the second image.

15. The electronic device according to claim 9, wherein the processor is further configured to:
   acquire the first biometric information and the second biometric information based on the synchronous acquisition process.

16. The electronic device according to claim 9, wherein the processor is further configured to:
   match the first biometric information with a first preset feature, to obtain a first authentication result;
   match the second biometric information with a second preset feature, to obtain a second authentication result; and
   determine that the predetermined object passes the biometric authentication in response to the first authentication result indicating that the first biometric information passes an authentication and the second authentication indicating that the second biometric information passes an authentication.

* * * * *